United States Patent [19]

Yoshizaki et al.

[11] 4,059,565
[45] Nov. 22, 1977

[54] PROCESS FOR PRODUCING A BRANCHED POLYCARBONATE OR POLY(ESTER-CARBONATE)

[75] Inventors: Hiroyuki Yoshizaki, Toyonaka; Hiromitsu Takanihashi, Takarazuka; Yoshitaka Masuda, Toyonaka, all of Japan

[73] Assignee: Mitsubishi Gas Chemical Company, Inc., Tokyo, Japan

[21] Appl. No.: 694,294

[22] Filed: June 9, 1976

[30] Foreign Application Priority Data

June 16, 1975 Japan .................................... 50-72921
June 16, 1975 Japan .................................... 50-72922
June 19, 1975 Japan .................................... 50-74768

[51] Int. Cl.$^2$ ............................................. C08G 63/62
[52] U.S. Cl. ............................................. 260/47 XA
[58] Field of Search ............. 260/47 XA, 463, 77.5 D

[56] References Cited

U.S. PATENT DOCUMENTS

| 3,030,331 | 4/1962 | Goldberg ......................... 260/47 XA |
| 3,094,508 | 6/1963 | Butterworth et al. .......... 260/47 XA |
| 3,169,121 | 2/1965 | Goldberg ......................... 260/47 XA |
| 3,525,712 | 8/1970 | Kramer ............................. 260/47 XA |
| 3,541,049 | 11/1970 | Cleveland ........................ 260/47 XA |
| 3,635,895 | 1/1972 | Kramer ............................. 260/47 XA |
| 3,816,373 | 6/1974 | Hoogeboom .................... 260/47 XA |
| 3,972,852 | 8/1976 | Inata et al. ......................... 260/47 C |

*Primary Examiner*—Theodore E. Pertilla
*Attorney, Agent, or Firm*—Brooks, Haidt, Haffner & Delahunty

[57] ABSTRACT

A polyfunctional organic compound, as a crosslinking agent, is used for producing a branched polycarbonate or poly(ester-carbonate).

7 Claims, No Drawings

PROCESS FOR PRODUCING A BRANCHED POLYCARBONATE OR POLY(ESTER-CARBONATE)

BACKGROUND OF THE INVENTION

1. Field of the Invention

This invention relates to an improved process for producing a branched polycarbonate or poly(ester-carbonate) having an excellent blow moldability and vacuum moldability, and more particularly to an improved process for producing said polycarbonate or poly(ester-carbonate) by using a new crosslinking agent.

2. Description of the Prior Art

Polycarbonates are known as resins of high heat resistance, but upon blow molding or vacuum molding, drawing-down of the polycarbonates is apt to occur by their own weight when melted because polycarbonates have a linear structure, and therefore it is difficult to mold an article having a uniform wall thickness and an article of large size.

For the purpose of overcoming the above mentioned drawbacks, there have been proposed some methods of producing branched polycarbonates or poly(ester-carbonate) in the presence of a crosslinking agent.

For example, U.S. Pat. No. 3,094,508 discloses that a part of bisphenol which is a starting material for a polycarbonate is replaced by a trisphenol, i.e. 2,4-bis(4-hydroxyphenylalkylidene) phenol to produce a branched polycarbonate. According to this method, the reaction should be carried out at a limited temperature range of 28°-34° C taking care not to cause the gelation, that is, formation of insoluble and infusible products.

U.S. Pat. Nos. 3,525,712 and 3,635,895 disclose that a thermoplastic randomly branched polycarbonate composition is produced by reacting a bisphenol and a carbonate precursor and the reaction is carried out in the presence of a finely divided solid polyfunctional organic compound. In this process, the crosslinking agent should be added before blowing phosgene, as a carbonate precursor, into the reaction system and further the blowing speed of the phosgene should be controlled.

U.S. Pat. No. 3,541,049 discloses a process for producing branched polycarbonates by using cyanuric chloride.

SUMMARY OF THE INVENTION

An object of the present invention is to provide an improved process for producing a branched polycarbonate or poly(ester-carbonate) having an excellent blow moldability and vacuum moldability.

Another object of the present invention is to provide an improved process for producing a branched polycarbonate or poly(ester-carbonate) which is thermally stabler and more colorless than conventional branched polycarbonate or poly(ester-carbonate).

A further object of the present invention is to provide an improved process for producing a branched polycarbonate or poly(ester-carbonate) by using a new crosslinking agent, i.e. a polyfunctional organic compound, which may be added to the reaction mixture at any time during the reaction and is highly miscible with the monomer components, other starting materials and solvents.

Still another object of the present invention is to provide an improved process for producing a branched polycarbonate or poly(ester-carbonate) which can be carried out in a manner similar to conventional processes for producing a polycarbonate or poly(ester-carbonate).

A still further object of the present invention is to provide an improved process for producing a branched polycarbonate or poly(ester-carbonate) in which the reaction of the crosslinking agent can be effected at room temperature when interfacial polycondensation is employed.

According to the present invention, there is provided a process for producing a branched polycarbonate or poly(ester-carbonate) by reacting a combination of a monomer component composed of an aromatic dihydroxy compound (A) or a mixture of an aromatic dihydroxy compound (A) and a dibasic acid derivative (B), and a polyfunctional organic compound (C), with a compound of the formula $$COM_2$$

where M is selected from the class of chloro and phenoxy, the improvement which comprises using, as the polyfunctional organic compound (C), a member selected from the compounds I, II and III of the formulas

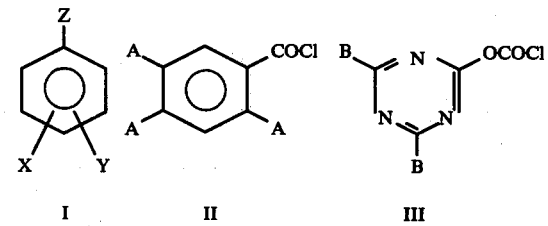

I      II      III where Z is selected from the class of chloroformyl (—COCl) and chloroformyloxy(—OCOCl), X and Y are similar or dissimilar and selected from the class of —COCl, —OCOCl, —OH and —COOH, and X and Y attach to 2- and 4-positions, 3-and 4-positions, or 3- and 5-positions based on the Z; A is similar or dissimilar and selected from the class of —COCl and —COOH; and B is similar or dissimilar and selected from the class of —OCOCl and —OH.

DESCRIPTION OF THE PREFERRED EMBODIMENTS

As aromatic dihydroxy compounds (A) used in the present invention, there may be mentioned halogen unsubstituted aromatic dihydroxy compounds and halogen substituted aromatic dihydroxy compounds.

Representative halogen unsubstituted aromatic dihydroxy compounds are bis(4-hydroxyphenyl)alkane such as 2,2-bis(4'-hydroxyphenyl)propane and the like; bis(4-hydroxyphenyl)ether; bis(4-hydroxyphenyl)sulfone; bis(4-hydroxyphenyl)sulfide; bis(4-hydroxyphenyl)sulfoxide; and derivatives thereof having lower alkyl substituents at the 3-position and/or 5-position of the phenyl nucleus.

Representative halogen substituted aromatic dihydroxy compounds are bis(3,5-dihalo-4-hydroxyphenyl)alkane such as 2,2-bis(3',5'-dichloro or dibromo-4'-hydroxyphenyl)propane and the like; bis(3,5-dichloro or dibromo-4-hydroxyphenyl)ether; bis-(3,5-dichloro or dibromo-4-hydroxyphenyl)sulfone; bis(3,5-dichloro or dibromo-4-hydroxyphenyl)sulfide; and bis(3,5-dichloro or dibromo-4-hydroxyphenyl)sulfoxide.

The aromatic dihydroxy compounds may be used alone or in combination.

When a halogen substituted aromatic dihydroxy compound is used in the present invention, the aromatic dihydroxy compound (A) preferably contains at least 1 mole % of the halogen substituted aromatic dihydroxy compound.

The resulting branched polycarbonate is of a high fire retardancy, a low dripping property upon combustion and a high impact strength.

The present inventors have found that a branched copolymer produced by crosslinking copolymers of bisphenol A and a tetrabromobisphenol A, i.e. 2,2-bis(3',5'-dibromo-4'-hydroxyphenyl)propane, known as a fireretardant monomer, with the new crosslinking agent according to the present invention has an excellent vacuum moldability and blow moldability, a low dripping property upon combustion and a high impact strength.

Heretofore, it is known that a copolymer of bisphenol A and tetrabromobisphenol A known as a fire-retardant polycarbonate has indeed a fire-retardant property, but is apt to cause dripping upon combustion and therefore, the polymer is often classified into SE-II according to a burning test of UL Subject 94. Further, in general, such fire-retardant copolymer has a very low impact strength. In other words, an important feature of polycarbonates, that is, a high impact strength, is lost. On the contrary, when the process of the present invention is used for preparing such fire-retardant polycarbonates, the resulting polycarbonates can retain the high impact strength and furthermore, are free from the above mentioned drawbacks.

According to another aspect of the present invention, a mixture of the aromatic dihydroxy compound (A) and a dibasic acid derivative (B) is used as a monomer component and is reacted with a carbonate precursor of the formula, $COM_2$, to produce a poly(ester-carbonate) having an ester bond in the polymer chain.

The resulting branched poly(ester-carbonate) has an improved fluidity upon molding as compared with the above mentioned branched polycarbonate produced without using the dibasic acid derivative (B).

The amount of the dibasic acid derivative (B) is preferably not more than 40 mole % based on the total moles of aromatic dihydroxy compound (A) and dibasic acid derivative (B).

Representative dibasic acid derivatives (B) are aromatic dibasic acid chlorides such as isophthaloyl chloride, terephthaloyl chloride and the like and aliphatic dibasic acid chlorides such as adipoyl chloride, sebacoyl chloride, hexahydroisophthaloyl chloride, hexahydroterephthaloyl chloride and the like.

The ratio of ester bond to carbonate bond in the poly(ester-carbonate) is almost determined by the ratio of the amount of the dibasic acid derivative (B) to that of the aromatic dihydroxy compound (A).

When the dibasic acid derivative (B) is used in an amount exceeding 40 mole % based on the total moles of (A) and (B), the resulting polymer has a very low solubility in solvents as shown in the following table.

| Molar ratio of material | | | Solubility in solvent* | | |
|---|---|---|---|---|---|
| Aromatic dihydroxy compound | Dibasic acid derivative | Proportion of carbonate bond, % | Sym-tetrachloroethane | Methylene chloride | Chloroform |
| 75 | 25 | 50 | ⊚ | ⊚ | ⊚ |
| 65 | 35 | 30 | ⊚ | O | O |
| 55 | 45 | 10 | Δ | Δ | Δ |
| 50 | 50 | 0 | x | x | x |

*15g. of sample is added to 100cc of a solvent to evaluate the solubility.
⊚ Very good
O Good
Δ Poor (undissolved portion remains)
x Insoluble Also, as is clear from the above table, the solubility of a polymer having only ester bonds excluding carbonate bonds is markedly different from that of the polymer produced by the process of the present invention which contains both ester bonds and carbonate bonds.

Upon producing branched polycarbonate or branched poly(ester-carbonate) according to the process of the present invention, the moles of the carbonate precursor of the formula of $COM_2$ such as phosgene, diphenylcarbonate and the like, is usually the same as or more than the moles of the aromatic dihydroxy compound (A). As far as the molar amount of the carbonate precursor can make the reaction proceed stoichiometrically, any molar amount may be optionally selected.

When the aromatic dihydroxy compound (A) is used together with the dibasic acid derivative (B), the molar amount of the carbonate precursor to be used is usually the difference between the moles of the aromatic dihydroxy compound (A) and those of the dibasic acid derivative (B) or more.

The most important feature of the present invention is to use a new crosslinking agent upon producing the branched polycarbonate or branched poly(ester-carbonate).

The new crosslinking agent, a polyfunctional organic compound (C) having three or more functional groups, has at least one chloroformyloxy or chloroformyl group.

The polyfunctional organic compound may be represented by one of the following formulas:

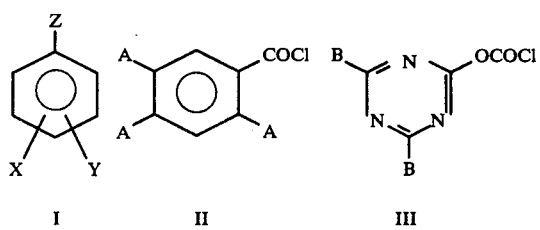

I   II   III where Z is selected from the class of chloroformyl (—COCl) and chloroformyloxy (—OCOCl); X and Y are similar or dissimilar and are selected from the class of —COCl, —OCOCl, —OH and —COOH, and X and Y attach to 2- and 4-positions, 3-and 4-positions, or 3- and 5-positions based on the Z; A is similar or dissimilar and is selected from the class of —COCl and —COOH; and B is similar for dissimilar and is selected from the class of —OCOCl and —OH.

Two or more of the above polyfunctional organic compounds may be used in combination.

Representative Compounds I are:

for example, trimesoyl chloride,
3,5-dichloroformylbenzoic acid,
5-chloroformylisophthalic acid, 1,3,5-trichloroformyloxybenzene,
3,5-dichloroformyloxyphenol,
5-chloroformyloxyresorcinol,
5-chloroformyloxyisophthaloyl chloride,
3-chloroformyl-5-chloroformyloxybenzoic acid,
5-hydroxyisophthaloyl chloride,
3-chloroformyl-5-hydroxybenzoic acid,
3,5-dichloroformyloxybenzoyl chloride,
3-chloroformyloxy-5-hydroxybenzoyl chloride,
3,5-dihydroxybenzoyl chloride,
3,5-dichloroformyloxybenzoic acid,
3-chloroformyloxy-5-hydroxybenzoic acid,
5-chloroformyloxyisophthalic acid,
trimellitoyl chloride,
2-carboxyterephthaloyl chloride,
4-carboxyisophthaloyl chloride,
4-carboxyphthaloyl chloride,
4-chloroformylphthalic acid,
4-chloroformylisophthalic acid,
2-chloroformylterephthalic acid,
1,2,4-trichloroformyloxybenzene,
2,5-dichloroformyloxyphenol,
2,4-dichloroformyloxyphenol,
4-chloroformyloxyresorcinol,
2,4-dihydroxybenzoyl chloride,
2-hydroxy-4-chloroformyloxybenzoyl chloride,
2-hydroxy-4-chloroformyloxybenzoic acid,
2,4-dichloroformyloxybenzoic acid,
2,4-dichloroformyloxybenzoyl chloride,
2,5-dihydroxybenzoyl chloride,
2-hydroxy-5-chloroformyloxybenzoic acid,
2-hydroxy-5-chloroformyloxybenzoyl chloride,
2,5-dichloroformyloxybenzoic acid,
2,5-dichloroformyloxybenzoyl chloride,
3,4-dihydroxybenzoyl chloride,
3-hydroxy-4-chloroformyloxybenzoic acid,
3,4-dichloroformyloxybenzoic acid,
3,4-dichloroformyloxybenzoyl chloride,
2-chloroformyloxyterephthalic acid,
2-carboxy-5-chloroformylphenol,
3-carboxy-6-chloroformylphenol,
2-chloroformyloxy-4-chloroformylbenzoic acid,
2-hydroxyterephthaloyl chloride,
2-chloroformyloxyterephthaloyl chloride,
4-chloroformyloxyisophthalic acid,
2-carboxy-4-chloroformylphenol,
4-carboxy-6-chloroformylphenol,
2-chloroformyloxy-5-chloroformylbenzoic acid,
4-hydroxyisophthaloyl chloride,
4-chloroformyloxyisophthaloyl chloride,
4-chloroformyloxyphthalic acid,
3-carboxy-4-chloroformylphenol,
4-carboxy-5-chloroformylphenol,
2-chloroformyl-5-chloroformyloxybenzoic acid,
4-hydroxyphthaloyl chloride, and
4-chloroformyloxyphthaloyl chloride.
Representative Compounds of II are:
for example, pyromellitoyl chloride,
5-carboxytrimellitoyl chloride,
2,5-dicarboxyterephthaloyl chloride,
4,6-dicarboxyisophthaloyl chloride,
4,5-dicarboxyphthaloyl chloride, and
5-chloroformyltrimellitric acid.
Representative Compounds of III are:
for example, 2,4,6-trichloroformyloxytriazine,
2-hydroxy-4,6-dichloroformyloxytriazine, and
2,4-dihydroxy-6-chloroformyloxytriazine.

The polyfunctional organic compound (C) is used in an amount of 0.1 to 2 mole % based on the moles of the aromatic dihydroxy compound (A). When the amount is more than 2 mole %, the resulting polymer is gelled and can not be dissolved in a solvent. On the contrary, when the amount is less than 0.1 mole %, the advantageous effect due to the branching structure is not observed substantially.

When the aromatic dihydroxy compound (A) is used together with the dibasic acid derivative (B), that is, a poly(ester-carbonate) is produced, the polyfunctional organic compound (C) is used preferably in an amount of 0.1 to 1 mole % based on the total moles of the aromatic dihydroxy compound (A) and the dibasic acid derivative (B) because when the amount is more than 1 mole %, the resulting polymer is gelled and is not soluble in a solvent while when the amount is less than 0.1 mole %, the advantageous effect due to the branching structure is not observed substantially.

As a method of polycondensation for carrying out the present invention, there may be employed, for example, interfacial polycondensation, interesterification, high or low temperature solution polycondensation and other known methods.

For example, the interfacial polycondensation may be conducted in the following manner.

A solution composed of an aromatic dihydroxy compound, an alkali, water and a solvent is prepared firstly. As the alkali, sodium hydroxide is preferred and used in an amount of the same as or more than the moles of the aromatic dihydroxy compound, and the amount is preferably that capable of rendering pH value of the reaction mixture upon polymerization more than 13.

As the solvent, there may be used inert organic solvents, for example, chlorinated aliphatic hydrocarbons such as methylene chloride, chloroform and the like, and the amount is optionally selected depending upon the desirable viscosity of a solution containing the copolymer.

Water is preferably used in an amount which makes the alkali concentration 5–10 % by weight.

Alkali, solvent and water may be added all at once or gradually in divided amounts depending upon each step.

To the polycondensation system may be added a chain terminating agent, a monohydric phenol such as phenol, p-t-butylphenol, tribromophenol and the like, and an antioxidant such as sodium dithionite.

Phosgene is blown into the resulting solution with stirring preferably at a speed capable of adding the whole amount of phosgene in 15 to 120 minutes. The temperature upon phosgene blowing is preferably 10° to 30° C, more preferred with about 20° C.

The polyfunctional organic compound, if desired, additionally the dibasic acid derivative, is added to the reaction system when the whole amount of phosgene has been added, but may be added before or during blowing phosgene.

The dibasic acid derivative is added preferably after completion of blowing phosgene.

The dibasic acid derivative and the polyfunctional organic compound may be added in the form of finely divided powder or liquid or a solution in an organic solvent and the like. Then a polymerization catalyst is added.

Representative polymerization catalysts are tertiary amines such as triethylamine, tributylamine and the like, or their salts, quaternary ammonium salts such as trimethylbenzyl ammonium chloride and the like, and other conventional catalysts for preparing polycarbonates.

Upon adding the catalyst, a vigorous agitation is preferable, and even after completion of adding the catalyst, the similar state is maintained to continue the polymerization reaction for further 15-120 min. The reaction temperature is preferably not lower than 15° C. When the dibasic acid derivatives is also used, the reaction temperature is preferably at least 20° C. The upper limit of the temperature is determined by the solvent used in the reaction system. The resulting product is recovered and purified by repeating washing with water until any chlorine ion is not detected in the water layer.

In addition, for example, when the branched polycarbonate or poly(ester-carbonate) is prepared by a high temperature solution polycondensation, the starting materials are added to a solvent and heated and the generated hydrogen chloride is taken away to outside of the reaction system to expedite the reaction. When phosgene is used, phosgene and the aromatic dihydroxy compound are subjected to a low temperature polycondensation in a solvent suitable for high temperature polycondensation and then heated, and the polyfunctional organic compound and if desired, additionally the dibasic acid derivative, are added and a dehydrochlorination is carried out. The solvent is preferably one having a boiling point higher than the reaction temperature, is inert to the starting materials and can dissolve the resulting polymer produced as the polycondensation proceeds. For example, an aromatic solvent such as o-dichlorobenzene and the like is preferable.

The reaction temperature preferably ranges from 150° to 300° C. In the dehydrochlorination reaction there may be used a known catalyst therefor.

According to the process of the present invention, there can be produced a branched polycarbonate or poly(estercarbonate) having an excellent blow moldability and vacuum moldability. The branched polycarbonate or poly(ester-carbonate) is thermally stabler and more colorless than the conventional branched polycarbonate or poly(ester-carbonate). The new cross-linking agent, the polyfunctional organic compound, may be added to the reaction mixture at any time during the reaction and is highly miscible with the monomer components, other starting materials and solvents.

The process of the present invention can be conducted in a manner similar to conventional processes for producing a polycarbonate or poly(ester-carbonate). Purification of the resulting polycarbonate or poly(estercarbonate) can be effected in a manner similar to that for conventional polycarbonate or poly(ester-carbonate). Further conventional apparatus for producing polycarbonate or poly(ester-carbonate) may be used for the process of the present invention.

When the process of the present invention is carried out by an interfacial polycondensation, the reaction of the crosslinking agent can be effected at room temperature.

The branched polycarbonate produced according to the process of the present invention is a thermoplastic resin, and may be used as a compound by mixing with a filler such as glass fiber and pigments, and articles of various shapes may be produced therefrom. For example, there can be produced injection molded and extruded articles such as pipes, tubes, and gaskets, films such as insulating film for condensers recording tape, pipe covering material, packing materials and the like. The branched polycarbonate is dyeable and can be mixed with other molding materials.

The branched polycarbonate or poly(ester-carbonate) can be used for producing a big article which can not be easily obtained by molding a conventional polycarbonate or poly(estercarbonate), and further, the wall thickness of the molded article is uniform.

In the following there are given examples of the present invention and comparison examples.

Since an exact determination of degree of branching is very difficult, the degree of branching is estimated by an index number of dependency of melt fluidity upon pressure (N) which is correlated with the branching structure. The index number of dependency of melt fluidity upon pressure (N) is determined as shown below.

The volumetric melt flow rate (V) (cc./sec.) is determined at 280° C at pressures of 160 Kg./cm.$^2$, 40 Kg./cm.$^2$, and 10 Kg./cm.$^2$ with a nozzle of 1 mm. in diameter X 10 mm. by using a Koka type flow tester.

The measured values are plotted on a graph having an abscissa on a logarithmic scale corresponding to the pressure and an ordinate on a logarithmic scale corresponding to the V-value.

The gradient of the plotted straight line, i.e. the ratio of the change of the V to the change of the pressure is the N-value.

The value V is denoted by omitting "X10$^{-2}$cc./sec.". For example, "3.0X10$^{-2}$cc./sec." is designated as "3.0".

The N-value of conventional linear polycarbonates is about 1.20 while N of the branched polycarbonate or poly(estercarbonate) of the present invention is about 1.30 when 0.1 mole % of the crosslinking agent is added. At N-values of at least about 1.30, the blow moldability and vacuum moldability are improved, and wall thickness of the molded article becomes uniform. In this specification, the N-value is given for the purpose of judging the improvement in blow moldability and vacuum moldability.

"Melt flow value" (Q) is a value determined at 280° C at 160 Kg./cm.$^2$ with a nozzle of 1 mm. in diameter X10 mm. by using a Koka type flow tester, and the unit is cc./sec.

The burning test is conducted by the vertical burning test of UL Subject 94. The sample thickness is 1/16 inch.

The invention will be understood more readily by reference to the following examples. However, these examples are intended to illustrate the invention and are not to be construed to limit the scope of the invention. In the examples, unless otherwise specified, where percents (%) are mentioned, they are percents by weight.

EXAMPLE 1

6.4 Kg. of bisphenol A and 150 g. of p-t-butylphenol were dissolved in an aqueous solution of 3.1 Kg. of sodium hydroxide in 37 liters of water at about 20° C with stirring, and further 10 g. of sodium dithionite and 15 liters of methylene chloride were added, and then 3.1 Kg. of phosgene was blown into the reaction mixture kept at 20° C over about 60 min. And immediately after completion of the phosgene blowing, 35.0 g. of trimesoyl chloride was directly added in the form of powder and agitated for further several minutes. 10 liters of methylene chloride was added and then 60 ml of a 10% solution of triethylamine in methylene chloride was added as a catalyst with vigorous stirring, and the resulting mixture was kept at 25° C for 1 hour to effect the polymerization. After completion of the polymerization, the water layer was removed and the remaining solution was washed with water repeatedly until no chlorine ion was detected in the resulting water layer. Then, toluene was added to the reaction system as a swelling agent and heated to remove the solvent and the resulting resin was recovered in the form of particles.

Table 1 shows the yield, intrinsic viscosity, index number of dependency of melt-fluidity upon pressure and physical properties of the molded article.

EXAMPLE 2

6.2 Kg. of bisphenol A, 560 g. of tetrabromobisphenol A, and 150 g. of p-t-butylphenol were dissolved in an aqueous solution of 3.1 Kg. of sodium hydroxide in 37 liters of water at about 20° C with stirring and then 10 g. of sodium dithionite and 15 liters of methylene chloride were added, and 3.2 Kg. of phosgene was blown into the reaction mixture kept at 20° C over about 60 minutes. Immediately after completion of the phosgene blowing, 30.0 g. of trimesoyl chloride dissolved in 500 ml. of methylene chloride was added to the reaction mixture followed by stirring for a further several minutes. 10 liters of methylene chloride was added and then 60 ml. of a 10 % solution of triethylamine in methylene chloride was added with vigorous stirring and kept at 25° C for 1 hour to effect the polymerization. After completion of the polymerization, the resulting resin was recovered in the form of particles in a way similar to Example 1. Table 1 shows the yield, intrinsic viscosity, index number of dependency of melt-fluidity upon pressure, and result of burning test.

Comparative Example 1

Repeating the procedure of Example 2 except that trimesoyl chloride was not added, the result was as shown in Table 1.

ylene chloride was added with vigorous stirring and the resulting mixture was kept at 25° C for 1 hour to effect the polymerization. After completion of the polymerization, the resulting resin was recovered in the form of particles in a way similar to Example 1. The result is as shown in Table 1.

Comparative Example 2

The procedure of Example 3 was repeated except that pyromellitoyl chloride was not added. The result is as shown in Table 1.

EXAMPLE 4

The same procedure as in Example 2 was repeated except that 32 g. of 5-chloroformyloxy isophthaloyl chloride was used in place of 30.0 g. of trimesoyl chloride, and as the result, a branched polycarbonate was obtained.

The polycarbonate was substantially the same as the polymer obtained in Example 2 in terms of index number of dependency of melt-fluidity upon pressure, burning test and physical properties.

EXAMPLE 5

The same procedure as that in Example 2 was repeated until completion of the phosgene blowing. After completion of the phosgene blowing, a solution of 32.0 g. of 5-hydroxyisophthaloyl chloride in 500 ml. of methylene chloride was added and the mixture was stirred for several minutes. 10 liters of methylene chloride was added and further 60 ml. of a 10% methylene chloride solution of triethylamine was added with vigorous stirring. The resulting reaction mixture was kept at a temperature of 25° C for 1 hour to effect the polymerization. After completion of the polymerization, the resulting resin was recovered in a form of particles in the same manner as in Example 1.

The result is shown in Table 1.

Table 1

| | | | Example | | | | Comparative Example | |
|---|---|---|---|---|---|---|---|---|
| | | | 1 | 2 | 3 | 5 | 1 | 2 |
| Yield (%) | | | 97 | 96 | 98 | 98 | 98 | 97 |
| Intrinsic viscosity [$\eta$] in methylene chloride, 25° C | | | 0.494 | 0.509 | 0.515 | 0.510 | 0.501 | 0.503 |
| Index number of dependency of melt fluidity upon pressure N | | | 1.59 | 1.54 | 1.61 | 1.55 | 1.20 | 1.21 |
| Burning test by UL method (1/16" thick) | | Class | — | SE-O | SE-O | SE-O | SE-II | SE-II |
| | | Dripping* | — | Not observed | Not observed | Not observed | observed | observed |
| Mechanical property | Tensile property | Strength, Kg./cm.$^2$ | 635 | 634 | 628 | 643 | 678 | 687 |
| | | Elongation at break, % | 119 | 108 | 105 | 112 | 121 | 102 |
| | Izod impact strength (notched bar, ft-lb/in) | | 16.3 | 15.4 | 14.8 | 15.0 | 2.2 | 2.4 |

*Whether or not specimens drip flaming particles which ignite cotton swatch.

EXAMPLE 3

4.9 Kg. of bisphenol A, 880 g. of tetrachlorobisphenol A and 105 g. of p-t-butylphenol were dissolved in an aqueous solution of 2.7 Kg. of sodium hydroxide in 35 liters of water at 20° C with stirring, and then 8 g. of sodium dithionite and 17 liters of methylene chloride were added, and 2.75 Kg. of phosgene was blown into the reaction mixture kept at 20° C over about 60 minutes and then immediately 33 g. of pyromellitoyl chloride as a crosslinking agent dissolved in 500 ml. of methylene chloride was added and stirred for several minutes. Then 60 ml. of a 10% solution of triethylamine in meth-

EXAMPLE 6

6.4 Kg. of bisphenol A and 150 g. of p-t-butylphenol were dissolved in an aqueous solution of 3.1 Kg. of sodium hydroxide in 37 liters of water at about 20° C with stirring, and 10 g. of sodium dithionite and 15 liters of methylene chloride were added. 2.7 Kg. of phosgene was blown into the resulting mixture kept at a temperature of 20° C over about 60 minutes. Immediately after completion of the phosgene blowing, a solution of 560 g. of isophthaloyl chloride and 72 g. of 2,4,6-trichloroformyloxytriazine as a crosslinking agent in 5 liters of methylene chloride was added, and then the mixture was stirred for several minutes. After addition of 10 liters of methylene chloride, 60 ml. of a 10% methylene chloride solution of triethylamine was further added as a polymerization catalyst with vigorous stirring. The resulting reaction mixture was kept at 25° C for 1 hour to effect the polymerization. After completion of the polymerization, the resulting water layer was removed and the remaining layer was washed with water repeatedly until no chlorine ion was detected in the resulting water layer. Toluene was added as a swelling agent to the reaction system and heated to remove the solvent so that the resulting resin was recovered in the form of particles.

Table 2 shows the yield, intrinsic viscosity, index number of dependency of melt-fluidity upon pressure, melt flow value and physical properties of the molded article.

Comparative Example 3

The same procedure as that in Example 6 was repeated except that 2,4,6-trichloroformyloxytriazine was not added.

The result is as shown in Table 2.

EXAMPLE 7

The same procedure as that in Example 6 was repeated until completion of the phosgene blowing. After completion of the phosgene blowing, 510 g. of adipoyl chloride and 48 g. of 6-chloroformylisophthalic acid as a crosslinking agent were added. The mixture was stirred for several minutes and 10 liters of methylene chloride was added. Further, 60 ml. of a 10% methylene chloride solution of triethylamine was added with vigorous stirring, and the resulting reaction mixture was kept at 25° C for one hour to effect the polymerization. After completion of the polymerization, the resulting resin was recovered in the form of particles in the same procedure as in Example 6.

The result is as shown in Table 2.

EXAMPLE 8

4.3 Kg. of bisphenol A, 1.6 Kg. of bis(4-hydroxyphenyl) sulfone and 115 g. of p-t-butylphenol were dissolved in an aqueous solution of 2.8 Kg. of sodium hydroxide in 35 liters of water at about 20° C with stirring. 10 g. of sodium dithionite and 17 liters of methylene chloride were added, and 2.7 Kg. of phosgene was blown into the resulting mixture which was kept at 20° C over about 60 minutes. After completion of the phosgene blowing, to the mixture was added a solution of 560 g. of a mixture of isophthaloyl chloride and terephthaloyl chloride (molar ratio of 3 : 1) and 33 g. of pyromellitoyl chloride as a crosslinking agent in 5 liters of methylene chloride, and then the mixture was stirred for several minutes. 10 liters of methylene chloride was added and 60 ml. of a 10% methylene chloride solution of triethylamine was further added with vigorous stirring. The resulting reaction mixture was kept at 25° C for one hour to effect the polymerization. After completion of the polymerization, the resulting resin was recovered in a form of particles in the same manner as that in Example 6.

The result is as shown in Table 2.

Table 2

| | | | Example | | | Comparative Example |
|---|---|---|---|---|---|---|
| | | | 6 | 7 | 8 | 3 |
| Yield (%) | | | 97 | 96 | 97 | 97 |
| Intrinsic viscosity [$\eta$] in methylene chloride, 25° C | | | 0.510 | 0.513 | 0.511 | 0.499 |
| Melt flow value Q, $\times 10^{-2}$ cc/sec | | | 5.2 | 6.3 | 5.0 | 5.9 |
| Index number of dependency of melt fluidity upon pressure N | | | 1.57 | 1.62 | 1.61 | 1.20 |
| Mechanical property | Tensile property | Strength, kg/cm$^2$ | 651 | 660 | 621 | 643 |
| | | Elongation at break, % | 109 | 105 | 89 | 112 |
| | Izod impact strength (notched bar, ft-lb/in) | | 16.1 | 15.8 | 13.8 | 2.1 |

EXAMPLE 9

6.2 Kg. of bisphenol A, 560 g. of tetrabromobisphenol A and 150 g. of p-t-butylphenol were dissolved in an aqueous solution of 3.1 Kg. of sodium hydroxide in 37 liters of water at about 20° C with stirring, and 10 g. of sodium dithionite and 15 liters of methylene chloride were added, and then 2.7 Kg. of phosgene was blown into the reaction mixture which was kept at 20° C. Immediately after completion of the phosgene blowing over about 60 minutes, a solution of 560 g. of isophthaloyl chloride and 72 g. of 2,4,6-trichloroformyloxytriazine as a crosslinking agent in 5 liters of methylene chloride was added, and the resulting mixture was stirred for several minutes. 10 liters of methylene chloride was added, and further 60 ml. of a 10% methylene chloride solution of triethylamine was added as a catalyst with vigorous stirring. The resulting reaction mixture was kept at a temperature of 25° C for 1 hour to effect the polymerization. After completion of the polymerization, the resulting water layer was removed and the remaining layer was repeatedly washed by newly adding water until any chlorine ion was not detected in the resulting water layer. Then, toluene was added as a swelling agent to the reaction system and heated to remove the solvent, and the resulting resin was recovered in a form of particles.

Table 3 shows the yield, intrinsic viscosity, index number of dependency of melt-fluidity upon pressure, melt flow value, the result of burning test and the physical properties of the molded article.

Comparative Example 4

The same procedure as that in Example 9 was repeated except that 2,4,6-trichloroformyloxytriazine was not added. The result is as shown in Table 3.

EXAMPLE 10

The same procedure as that in Example 9 was repeated until completion of blowing the phosgene. After completion of the phosgene blowing, 510 g. of adipoyl chloride and 48 g. of 6-chloroformylisophthalic acid as a crosslinking agent were added to the mixture. After the reaction mixture was stirred for several minutes, 10 liters of methylene chloride was added and 60 ml. of a 10% methylene chloride solution of triethylamine was further added as a catalyst with vigorous stirring. The resulting reaction mixture was kept at a temperature of 25° C for 1 hour to effect the polymerization. After completion of the polymerization, the resulting resin was recovered in a form of particles in the same manner as in Example 9. The physical properties of the resin are as shown in Table 3.

EXAMPLE 11

4.9 Kg. of bisphenol A, 880 g. of tetrachlorobisphenol A and 105 g. of p-t-butylphenol were dissolved in an aqueous solution of 2.7 Kg. of sodium hydroxide in 35 liters of water at about 20° C with stirring, and 8 g. of sodium dithionite and 17 liters of methylene chloride was further added, and then 2.4 Kg. of phosgene was blown into the reaction mixture which was kept at a temperature of 20° C over about 60 minutes. Immediately after completion of blowing the phosgene, a solution of 750 g. of sebacoyl chloride and 50 g. of trimellitoyl chloride as a crosslinking agent in 5 liters of methylene chloride was added, and the resulting mixture was stirred for several minutes. 60 ml. of a 10% methylene chloride solution of triethylamine was added as a catalyst with vigorous stirring, and the resulting mixture was kept at a temperature of 25° C for 1 hour to effect the polymerization. After completion of the polymerization, the resulting resin was recovered in the form of particles in the same manner as in Example 9.

The physical properties of the resin are as shown in Table 3.

EXAMPLE 12

6.2 Kg. of bisphenol A, 560 g. of tetrabromobisphenol A and 150 g. of p-t-butylphenol were dissolved in an aqueous solution of 2.9 Kg. of sodium hydroxide in 37 liters of water at a temperature of about 20° C with stirring, 10 g. of sodium dithionite and 15 liters of methylene chloride were further added, and then 2.8 Kg. of phosgene was blown into the resulting mixture which was kept at a temperature of 20° C over about 60 minutes. Immediately after completion of the phosgene blowing, a solution of 160 g. of sebacoyl chloride and 32.0 g. of trimesoyl chloride as a crosslinking agent in 5 liters of methylene chloride was added, and the resulting mixture was stirred for several minutes. 10 liters of methylene chloride was added, and then 60 ml. of a 10% methylene chloride solution of triethylamine was added with vigorous stirring, and the resulting mixture was kept at a temperature of 25° C for 1 hour to effect the polymerization. After completion of the polymerization, the resulting resin was recovered in a form of particles in the same manner as that in Example 9.

The physical properties of the resin are as shown in Table 3.

Comparative Example 5

The same procedure as that in Example 12 was repeated except that trimesoyl chloride was not added.

The physical properties of the resulting resin are as shown in Table 3.

EXAMPLE 13

The same procedure as that in Example 9 was repeated until completion of blowing phosgene. Immediately after completion of the phosgene blowing, a solution of 560 g. of isophthaloyl chloride and 33 g. of pyromellitoyl chloride as a crosslinking agent in 5 liters of methylene chloride was added, and the resulting mixture was stirred for several minutes. 10 liters of methylene chloride was added, and 60 ml. of a 10% methylene chloride solution of triethylamine with vigorous stirring was further added, and the resulting reaction mixture was kept at a temperature of 25° C for 1 hour to effect the polymerization. After completion of the polymerization, the resulting resin was recovered in a form of particles in the same manner as that in Example 9.

The physical properties of the resin are as shown in Table 3.

EXAMPLE 14

The same procedure as that in Example 9 was repeated until completion of blowing phosgene. Immediately after completion of the phosgene blowing, a solution of 560 g. of isophthaloyl chloride and 32.0 g. of trimellitoyl chloride as a crosslinking agent in 5 liters of methylene chloride was added, and the resulting mixture was stirred for several minutes. 10 liters of methylene chloride was added, and thereafter, 60 ml. of a 10% methylene chloride solution of triethylamine was further added with vigorous stirring. The resulting reaction mixture was kept at a temperature of 25° C for 1 hour to effect the polymerization. After completion of the polymerization, the resulting resin was recovered in a form of particles in the same manner as that in Example 9.

The physical properties of the resin are as shown in Table 3.

Comparative Example 6

6.2 Kg. of bisphenol A, 560 g. of tetrabromobisphenol A and 105 g. of p-t-butylphenol were dissolved in an aqueous solution of 3.1 Kg. of sodium hydroxide in 37 liters of water at about 20° C with stirring, and 10 g. of sodium dithionite and 15 liters of methylene chloride were added. 3.2 Kg. of phosgene was then blown into the resulting mixture kept at 20° C over about 60 minutes. After completion of the phosgene blowing, 10 liters of methylene chloride was added, and further 60 ml. of a 10% methylene chloride solution of triethylamine was added with vigorous stirring. The resulting reaction mixture was kept at a temperature of 25° C for 1 hour to effect the polymerization. After completion of the polymerization, the resulting resin was recovered in a form of particles in the same manner as that in Example 9.

The physical properties of the resin are as shown in Table 3.

Table 3

| | | Example | | | | | | Comparative Example | | |
|---|---|---|---|---|---|---|---|---|---|---|
| | | 10 | 11 | 12 | 13 | 14 | 15 | 4 | 5 | 6 |
| Yield (%) | | 97 | 95 | 96 | 96 | 98 | 98 | 96 | 98 | 98 |
| Intrinsic viscosity $[\eta]$ in methylene chloride, 25° C | | 0.503 | 0.494 | 0.501 | 0.504 | 0.496 | 0.501 | 0.489 | 0.490 | 0.492 |
| Melt flow value Q, $\times 10^{-2}$cc/sec | | 5.1 | 5.9 | 6.6 | 5.4 | 5.3 | 5.2 | 5.5 | 5.7 | 3.0 |
| Index number of dependency of melt fluidity upon pressure N | | 1.57 | 1.59 | 1.61 | 1.54 | 1.59 | 1.55 | 1.21 | 1.20 | 1.23 |
| Burning test by UL method (1/16" thick) | Class | | | SE-O | | | | | SE-II | |
| | Dripping* | | | Not observed | | | | | Observed | |

Table 3-continued

| | | | Example | | | | | | Comparative Example | | |
|---|---|---|---|---|---|---|---|---|---|---|---|
| | | | 10 | 11 | 12 | 13 | 14 | 15 | 4 | 5 | 6 |
| Mechanical strength | Tensile property | Strength, kg/cm$^2$ | 651 | 635 | 644 | 632 | 637 | 643 | 624 | 630 | 678 |
| | | Elongation at break, % | 114 | 120 | 119 | 125 | 123 | 118 | 110 | 102 | 120 |
| | | Izod impact strength (notched bar, ft-lb/in) | 16.2 | 16.1 | 15.8 | 15.3 | 14.8 | 15.2 | 2.1 | 2.0 | 2.2 |

*Whether or not speciments drip flaming particles which ignite cotton swatch.

We claim:

1. In a process for producing a branched polycarbonate or poly(ester-carbonate) by reacting a combination of a monomer component composed of an aromatic dihydroxy compound (A) or a mixture of an aromatic dihydroxy compound (A) and a dibasic acid derivative (B), and a polyfunctional organic compound (C), with a compound of the formula

COM$_2$ where M is selected from a class of chloro and phenoxy, the improvement which comprises using, as the polyfunctional organic compound (C), a member selected from the compounds I, II, and III of the formulas

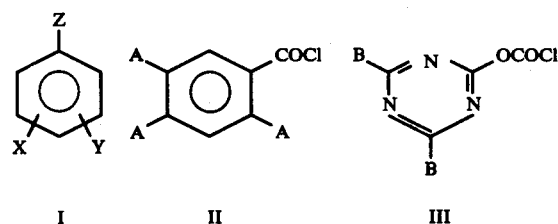

I  II  III where Z is selected from the class of chloroformyl (—COCl) and chloroformyloxy (—OCOCl), X and Y are similar or dissimilar and selected from the class of —COCl, —OCOCl, —OH and —COOH, and X and Y attach to 2- and 4-positions, 3- and 4-positions, or 3- and 5-positions based on the Z; A is similar or dissimilar and selected from the class of —COCl and —COOH; and B is similar or dissimilar and selected from the class of —OCOCl and —OH, the quantity of compound (C) being sufficient and up to 2 mole % based on the moles of compound (A) to provide a branching structure and to permit the polymer to be dissolved in a solvent.

2. A process for producing a branched polycarbonate according to claim 1 in which the monomer component is an aromatic dihydroxy compound (A), and the polyfunctional organic compound (C) is used in an amount of 0.1 — 2 mole % based on the moles of the aromatic dihydroxy compound (A).

3. A process for producing a branched poly(estercarbonate) according to claim 1 in which the monomer component is a mixture of an aromatic dihydroxy compound (A) and a dibasic acid derivative (B), and the polyfunctional organic compound (C) is used in an amount of 0.1 - 1 mole % based on the moles of the mixture.

4. A process according to claim 3 in which the dibasic acid derivative (B) is an aromatic dibasic acid chloride, an aliphatic dibasic acid chloride, or a mixture thereof.

5. A process according to claim 3 in which the dibasic acid derivative (B) is used in an amount of not more than 40 mole % based on the total moles of the dibasic acid derivative (B) and the aromatic dihydroxy compound (A).

6. A process according to claim 1 in which the aromatic dihydroxy compound (A) is a halogen unsubstituted aromatic compound.

7. A process according to claim 1 in which the aromatic dihydroxy compound (A) contains at least 1 mole % of a halogen substituted aromatic dihydroxy compound.

* * * * *

UNITED STATES PATENT AND TRADEMARK OFFICE
CERTIFICATE OF CORRECTION

PATENT NO. : 4,059,565
DATED : November 22, 1977
INVENTOR(S) : HIROYUKI YOSHIZAKI ET AL It is certified that error appears in the above-identified patent and that said Letters Patent are hereby corrected as shown below:

Title page, under [75] Inventors, correct the spelling of the second inventor's last name to read --Takanohashi--.

Column 4, line 60, change "for" to --or--.

Column 7, line 9, change "derivatives" to --derivative--.

Column 7, line 68, insert a comma after "condensers".

Signed and Sealed this

Seventh Day of March 1978

[SEAL]

Attest:

RUTH C. MASON
Attesting Officer

LUTRELLE F. PARKER
Acting Commissioner of Patents and Trademarks